United States Patent [19]

Mori

[11] Patent Number: 4,898,439
[45] Date of Patent: Feb. 6, 1990

[54] LIGHT RADIATION DEVICE FOR USE IN MEDICAL TREATMENT

[76] Inventor: Kei Mori, 3-16-3-501, Kaminoge, Setagaya-ku, Tokyo, Japan

[21] Appl. No.: 270,894

[22] Filed: Nov. 14, 1988

[30] Foreign Application Priority Data

Feb. 10, 1988 [JP] Japan ................................ 63-30338
Jul. 1, 1988 [JP] Japan ................................ 63-164266

[51] Int. Cl.⁴ .................... G02B 6/00; A61B 17/36
[52] U.S. Cl. ......................... 350/96.10; 350/96.18; 350/96.20; 350/96.22; 128/362; 128/397; 606/9; 606/16
[58] Field of Search ............... 350/96.10, 96.15, 96.18, 350/96.20, 96.22, 96.23; 128/303.1, 362, 395, 396, 397; 362/32

[56] References Cited

U.S. PATENT DOCUMENTS

| 3,621,181 | 11/1971 | Young | 128/395 X |
| 4,576,436 | 3/1986 | Daniel | 350/96.10 |
| 4,625,724 | 12/1986 | Suzuki et al. | 128/303.1 |
| 4,723,825 | 2/1988 | Herold | 350/96.10 |
| 4,785,811 | 11/1988 | Mori | 128/397 |
| 4,794,925 | 1/1989 | Mori | 128/397 |
| 4,796,967 | 1/1989 | Mori | 350/96.10 |
| 4,804,240 | 2/1989 | Mori | 350/96.10 |
| 4,834,484 | 5/1989 | Gorman et al. | 350/96.10 X |

FOREIGN PATENT DOCUMENTS

| 0208309 | 1/1987 | European Pat. Off. | 128/395 X |
| 2184021 | 6/1987 | United Kingdom | 128/303.1 |

Primary Examiner—William L. Sikes
Assistant Examiner—Brian M. Healy
Attorney, Agent, or Firm—Jordan and Hamburg

[57] ABSTRACT

A light radiation device for use in medical treatment comprises a ring-shaped light source portion and a cylindrical transparent light radiation portion. The ring-shaped light source comprises a connector for connecting a fiber optic cable thereto and a plurality of optical fibers each having one end connected to the connector and having another end terminating at one end of the ring-shaped light source portion so as to form a light-radiating surface thereon. The cylindrical light radiating portion has one end removably connected to the light-radiating surface of the light radiation portion and another end having a large number of tapered teeth thereon.

4 Claims, 5 Drawing Sheets

LIGHT RADIATION DEVICE FOR USE IN MEDICAL TREATMENT

BACKGROUND OF THE INVENTION

The present invention relates to a light radiation device for use in medical treatment, in particular, a light radiation device capable of irradiating a patient's scalp with light rays transmitted through a fiber optic cable.

In recent years, a large number of persons suffer from difficult-to-cure diseases such as gout, neuralgia and rheumatism, or suffer from pain from injury scars, bone fracture scars and ill-defined diseases. Furthermore, no one can be free from their skin aging which progresses gradually from a comparatively young age. On the other hand, the present applicant has previously proposed to focus solar rays or artificial light rays by the use of lenses or the like, to guide the focused light rays into a fiber optic cable and to transmit them to any place where the light is desired for illumination or for other purposes, as for example, to cultivate plants, chlorella, fish or the like. Through research, it has been found that the visible light not containing ultraviolet and infrared rays is effective not only for promoting the health of persons and to prevent their skin from aging (by increasing a living body reaction) but also to noticeably aid in healing gout, neuralgia, bedsores, rheumatism, burn scars, skin diseases, injury scars, bone fracture scars etc. and in relieving the pain from such diseases.

Further, on the basis of the above-mentioned inventor's discovery, the applicant has previously proposed a light radiation device for radiating visible light not containing harmful ultraviolet rays and infrared rays with the aim of using them for healing various types of diseases, giving beauty treatments and for promoting people's health. A light radiation device for use in medical treatment as previously proposed by the present applicant comprises a fiber optic cable for receiving sunlight or artificial light at its input end, and for transmitting the light therethrough and a hood member installed at the light-emitting end portion of the fiber optic cable. The light to be transmitted through the fiber optic cable is one that corresponds to visible-spectrum light (white-coloured light) obtainable in various ways as previously proposed by the present applicant. At the time of giving a medical treatment, a patient is placed in the chair and the visible-spectrum light thus transmitted through the fiber optic cable is radiated onto the diseased part of a patient.

As mentioned above, the light to be radiated onto the diseased part of a patient corresponds to the visible-spectrum components of sunlight and is therefore free from harmful elements such as ultraviolet and infrared rays. Consequently, it is possible to give medical treatments safely without fear of exposing a patient to harmful ultraviolet and infrared rays. However, the light radiation device referred to, which is mainly used for healing the above-mentioned diseases by radiating the light onto the patient's diseased part, has proven not to be adequate for healing the patient's scalp since the light can be prevented by the hair from reaching the scalp's surface.

SUMMARY OF THE INVENTION

It is an object of the present invention to provide a light radiation device which is suitable for irradiating the scalp of a patient with the light transmitted through the fiber optic cable.

DESCRIPTION OF THE PREFERRED EMBODIMENTS

Figure 1:
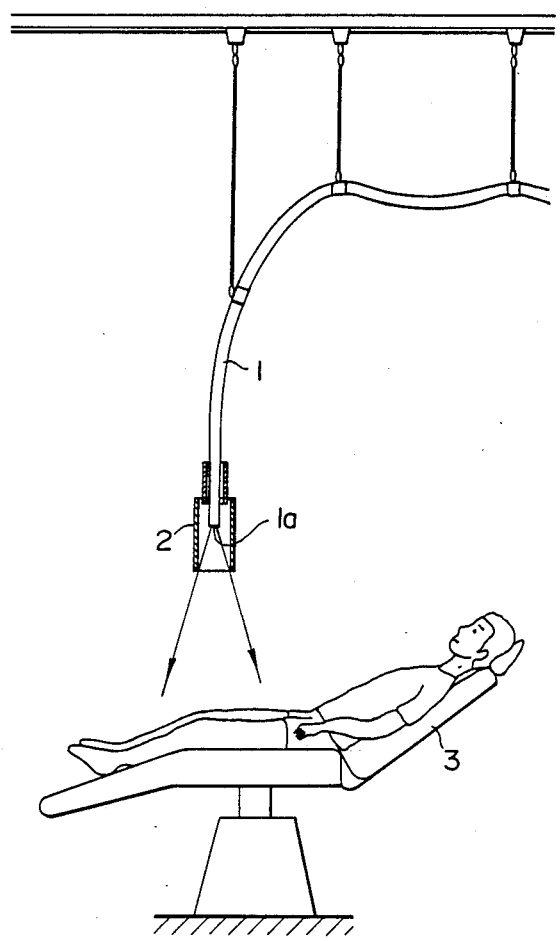
FIG. 1 is a view for explaining an embodiment of the light radiation device previously proposed by the present applicant for use in medical treatment.

FIG. 1 is a construction view for explaining an embodiment of the light radiation device for use in medical treatment as previously proposed by the present applicant. In FIG. 1, numeral 1 designates a fiber optic cable for receiving sunlight or artificial light at its input end, not shown in FIG. 1, and for transmitting the light therethrough.

The light to be transmitted through fiber optic cable 1 is one that corresponds to visible-spectrum light (white-colored light) obtainable in various ways as was previously proposed by the present applicant. In FIG. 1, 2 is a hood member installed at the light-emitting end portion 1a of the fiber optic cable 1 and 3 is a chair for a patient. At the time of medical treatment, a patient is placed in the chair 3 and the visible-spectrum light thus delivered through the fiber optic cable 1 is radiated onto the diseased part of a patient. As mentioned above, the light to be radiated onto the diseased part of the patient is the one that corresponds to the visible-spectrum components of sunlight and does not contain harmful rays such as ultraviolet and infrared rays. Consequently, it may be possible to administer medical treatment safely without fear of exposing a patient to harmful ultraviolet and infrared rays. However, the above-mentioned light radiation device, which is to be used for healing the above-mentioned diseases by radiating the light onto the skin's surface has proved to be inadequate for healing the surface of a patient's head because the light may be obstructed by the person's hair and thereby cannot reach the skin's surface.

Figure 2:
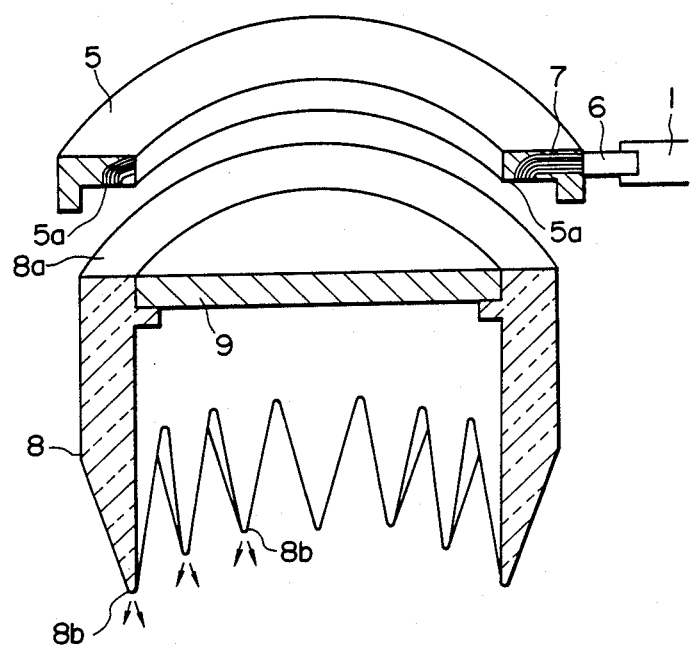
FIG. 2 is a cross-sectional view for explaining an embodiment of the light radiation device for use in medical treatment according to the present invention.

FIG. 2 is a sectional view for explaining an embodiment of the light radiation device according to the present invention.

In FIG. 2, 1 is a fiber optic cable for transmitting therethrough the sunlight collected by a solar ray collecting device not shown in FIG. 2, 5 is a ring-shaped light source portion and 8 is a cylindrical light-radiating portion. The ring-shaped light source portion 5 is provided with a connector 6 for connecting thereto the fiber optic cable 1 and includes therein a number of optical fibers 7 each having one end connected to the connector 6 and having another end arranged to form a ring at one end surface 5a of the ring-shaped light source portion 5.

When the ring-shaped light source portion 5 is connected by its connector 6 to the fiber optic cable, the light transmitted through the fiber optic cable 1 is guided into each of the optical fibers 7 through the connector 6 and emitted from the outlet end of each optical fiber. Consequently, the ring-shaped light portion 5 emits a ring-formed light from its outlet end 5a. On the other hand, the cylindrical portion 8 made of transparent material has one end 8a removably attached to the light-emitting end 5a of the light source portion and another end having a large number of tapered teeth 8b.

When the end 8a of the cylindrical portion 8 is connected to the light-emitting end 5a of the light source portion 5, the light emitted from the light-emitting end 5a is guided through the inlet end 8a into the cylindrical portion 8, propagates therethrough and is emitted from the tapered teeth 8b thereof. Consequently, when the end with teeth 8b of the cylindrical portion 8 is placed on a patient's head, the light delivered through the fiber optic cable 1 can be directly radiated onto the head's skin without being blocked out by the hair. Furthermore, a lens 9 can be removably attached to the cylindrical portion 8 as the occasion demands. If the cylindrical portion 8 is provided with the lens 9 and a document is placed under the end with teeth 8b, the light radiation device can also be used as an enlarger by effectively utilizing the light emitted from the end with teeth 8b.

Figure 3:
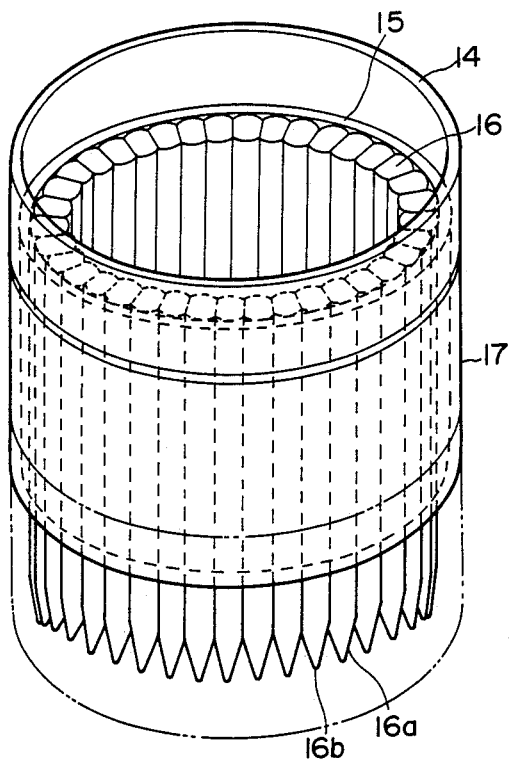
FIG. 3 is a perspective view for explaining an embodiment of the light radiation device for use in medical treatment according to the present invention.

FIG. 3 is a perspective view for explaining another embodiment of the light radiation device for use in medical treatment according to the present invention.

In FIG. 3, numeral 14 designates a fitted portion, 15 a cylindrical holding member and 16 a light-radiating portion wherein a large number of column members with a tapered tip 16a, made of transparent material such as acrylic resin or the like, are cylindrically arranged and unitarily bonded to each other with optical paste or the like. The light-radiating portion 16 is supported by a holder 15 in the fitting portion 14. Consequently, the light-radiating portion 16 has a number of teeth at its outlet end. Needless to say, it is also possible to integrally mold the light-radiating portion 16 by the injection molding method.

When a reflecting surface is formed at the periphery of the part with teeth 16a of the light-radiating portion 16, the light-transmitting efficiency of the light-radiating portion can be increased. The cylindrical holding member 15 is not always needed.

Figure 4:
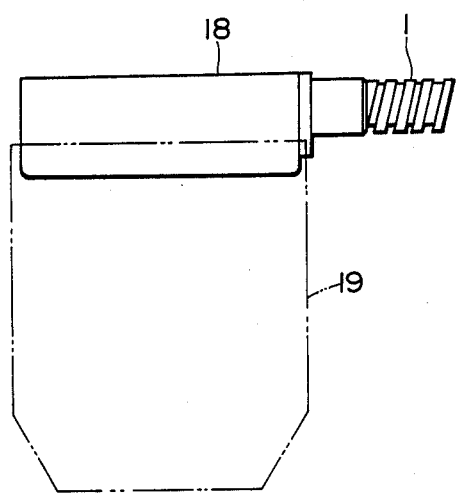
FIG. 4 is a view for explaining an embodiment of the light radiation device when being used.

FIG. 4 is a view for explaining an embodiment of the light radiation device when being used. In FIG. 4, numeral 1 designates a fiber optic cable for transmitting there-through the sunlight collected by the solar ray collecting device not shown in FIG. 4, 18 a sunlight radiation source portion connected to the fiber optic cable and 19 a light radiation device shown in FIG. 3.

The sunlight radiation source portion 18 has a ring-shaped light-radiating surface for emitting the light transmitted through the fiber optic cable.

When the ring-shaped sunlight radiation source 18 is fitted into the light radiation device 19, i.e. the ring-shaped light-emitting surface of the sunlight radiation source 18 is matched with the upper end surface of the cylindrical light-radiating portion of the light radiation device 19, the light emitted from the ring-shaped light-emitting surface of the sunlight radiation source 18 propagates through the cylindrical light-radiating portion of the light radiation device 19 and then it is emitted from the tapered teeth 16b at the outlet of the light-radiating portion.

Consequently, when the tapered teeth 16b of the light-radiating portion of the light radiation device are placed on the patient's head, the light delivered through the fiber optic cable 1 can be directly radiated onto the scalp without being obstructed by the hair.

When the outer cylindrical body 17, movably put onto the periphery of the cylindrical light-radiating portion, slides for example to the position shown by a two-dotted chain line in FIG. 3, there may be some distance between the teeth 16b of the light-radiating device and the skin's surface to be irradiated, namely, the light radiation intensity is adjustable. Consequently, it is possible to easily radiate the light with the desired intensity when the device is used for healing any other part of a patient besides the scalp. Furthermore, when the outer cylindrical body 17 is made of a transparent material, it is possible to observe the process of light radiation while treating a patient.

As is apparent from the foregoing description, according to the present invention, it may be possible to provide a light radiation device for use in medical treatment, which has a large number of tapered teeth at its outlet end for emitting the light and thereby can effectively and directly radiate the light rays onto the surface of a patient's head without being obstructed by hair.

Figure 5:
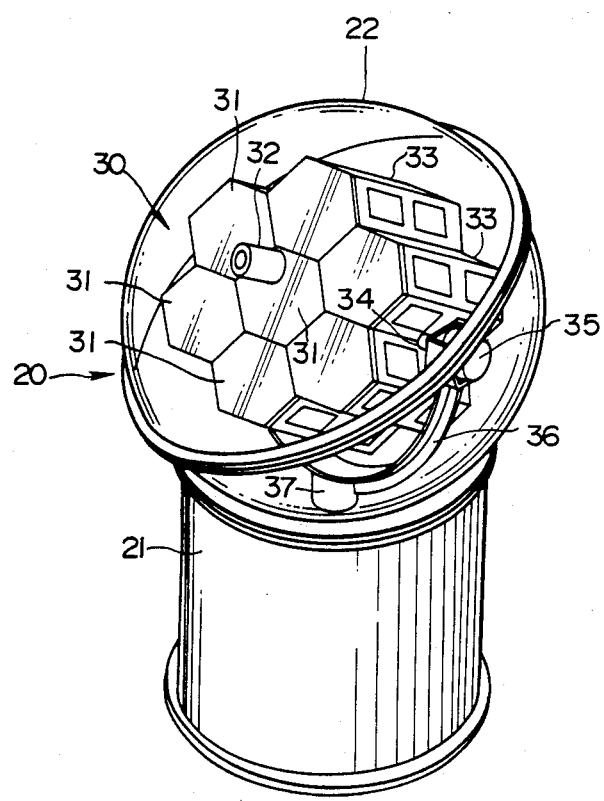
FIG. 5 is a view for explaining an example of a solar ray collecting device to be used in an embodiment of the present invention.

FIG. 5 is an entire perspective view illustrating a solar ray collecting device for guiding sunlight into the afore-mentioned fiber optic cable 1. In FIG. 5, a capsule 20 for use in the solar ray collecting device is constructed of a cylindrical body 21 and a transparent dome-shaped head 22. As shown in FIG. 5, the solar ray collecting device 30 is accommodated in the capsule 20 while the device is being used. The solar ray collecting device 30 comprises one lens, several lenses or possibly a large number of lenses 31, a solar position sensor 32 for detecting the sun's location, a support frame body 33 for integrally holding the lens 31 and the sensor 32, a first-revolution shaft 34 for rotating the support frame 33, a first-motor 35 for rotating the first-revolution shaft 34, a support arm 36 for supporting the lens 31 or the motor 35, a second-revolution shaft 37 installed so as to intersect the first-revolution shaft 34 perpendicularly thereto, and a second-motor, not shown in FIG. 5, for rotating the second revolution-shaft 37.

The direction of the sun is detected by means of a solar position sensor 32 and its detection signal controls the first and second motors so as to always direct the lens 31 toward the sun, and the sunlight focused by the lens 31 is guided into the fiber optic cable, not shown in FIG. 5, through its end surface set at the focal point of the lens. The guided sunlight is transmitted through the fiber optic cable to wherever the light is needed.

Concerning the above-mentioned solar ray collecting device, several types of devices have been proposed by the inventor. They are devices respectively having a lens or several lenses (2 to 4 lenses) or a large number of lenses (for instance 7, 19, 61, 196, or 1600 lenses) in accordance with the purpose of its use.

Figure 6:
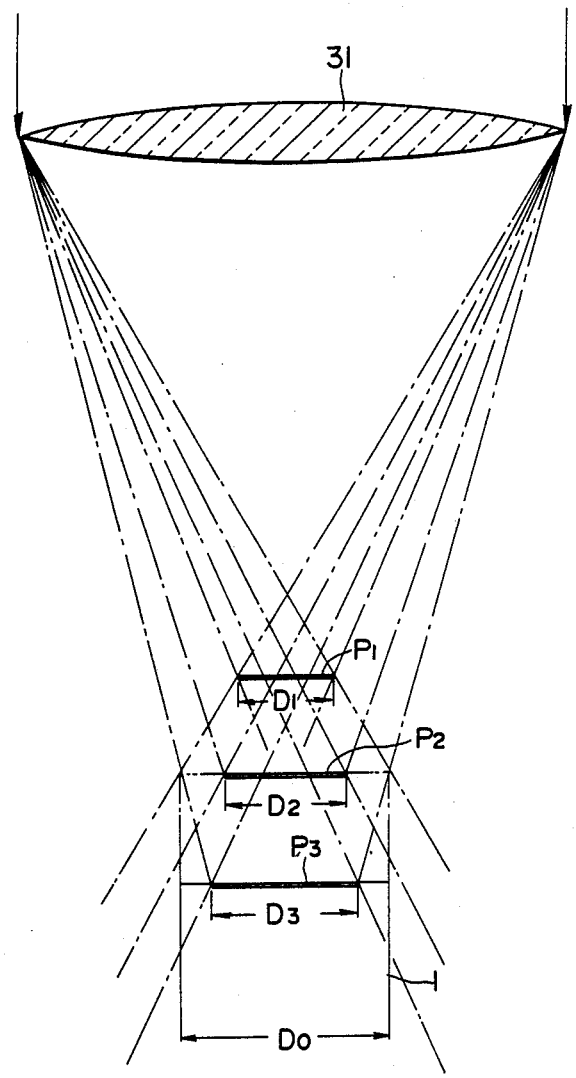
FIG. 6 is a view for explaining an embodiment for guiding sunlight into a fiber optic cable.

FIG. 6 is a view for explaining how to guide the light rays corresponding to the visible spectrum components of the sunlight into a fiber optic cable 1. In FIG. 6, 31 is a lens system consisting of a Fresnel lens or the like, and the sunlight focused by the lens system 31 is guided into a fiber optic cable 1 as mentioned before. In the case of focusing the sunlight through the lens system, the solar image has a central portion consisting of almost white light and a circumferential portion containing therein a large amount of light components of the wavelengths corresponding to the focal point of the lens system. Namely, in the case of focusing the sunlight through the lens system, the focal point and the size of the solar image will vary in accordance with the component wave-lengths of the light. For instance, the blue color light having a short wave-length makes a solar image of diameter D1 at position P1. Furthermore, the green color light makes a solar image of diameter D2 at position P2 and the red color light makes a solar image of diameter D3 at position P3.

Consequently, as shown in FIG. 6, when the light-receiving end-surface of the fiber optic cable 1 is set at position P1, it is possible to collect the sunlight containing plenty of the blue color components at the circumferential portion thereof.

When the light-receiving end-surface of the fiber optic cable 1 is set at position P2, it is possible to collect the sunlight containing many of the green color components at the circumferential portion thereof. When the light-receiving end-surface of the fiber optic cable 1 is set at position P3 it is possible to collect the sunlight containing many of the red color components at the circumferential portion thereof. In each case, the diameter of the fiber optic cable can be selected in accordance with the light ray components to be collected. For instance, the required diameters of the fiber optic cables are D1, D2 and D3, respectively, depending on the colors of the light rays to be stressed, i.e. the blue, green and red colors. In such a way, the required amount of the fiber optic cable can be saved and thereby the sunlight containing therein plenty of desired color components can be collected most effectively. And further, as shown in FIG. 6, if the diameter of the light-receiving end of the fiber optic cable 1 is enlarged to D0, it is possible to collect visible light rays containing therein all of the wavelength components.

The visible light thus obtained is transmitted through the fiber optic cable to the light radiation device according to the present invention, wherein the light is guided into the portion with teeth, reflected at the circumference thereof and emitted therefrom.

I claim:

1. A light radiation device for use in medical treatment comprising a fiber optic cable, a ring-shaped light source portion and a cylindrical transparent light radiation portion, said ring-shaped light source portion including a connector for connecting said fiber optic cable thereto, an end surface, and a plurality of optical fibers each having one end connected to said connector and having another end terminating at said end surface of said ring-shaped light source portion so as to form a ring-shaped light-radiating surface thereon, said cylindrical light-radiating portion having a first end removably connected to the ring-shaped light-radiating surface of said light source portion and a second end having a plurality of tapered teeth thereon, and an enlarging lens removably secured within said cylindrical light radiation portion for observation of an object upon which light is being radiated by said cylindrical light radiation portion.

2. A light radiation device for use in medical treatment comprising a fiber optic cable, a ring-shaped light source portion and a cylindrical transparent light radiation portion having a common longitudinal axis, said ring-shaped light source portion including a connector for connecting said fiber optic cable thereto, an end surface, and a plurality of optical fibers having one end connected to said connector and another end arranged flush with said end surface of said ring-shaped light source portion so as to form a light-radiating ring surface, said cylindrical light radiation portion having a first end removably connected to the light-radiating surface of said ring-shaped light source portion and a second end formed with a plurality of tapered teeth thereon, and an outer cylinder surrounding said cylindrical light radiation portion and being capable of sliding in the direction of said longitudinal axis.

3. A light radiation device for use in medical treatment as set forth in claim 2, wherein said outer cylinder comprises a transparent material.

4. A light radiation device for use in medical treatment as set forth in claim 1, wherein said cylindrical light-radiating portion comprises a plurality of elongated members, each elongated member having a tapered tooth, and means bonding said plurality of elongated members in a cylindrical arrangement.

* * * * *